United States Patent Office 3,579,425
Patented May 18, 1971

3,579,425
PREPARATION OF PROSTAGLANDINS
David Adriaan van Dorp and Roelof Karel Beerthuis, Vlaardingen, Diederik Hendrik Nugteren, Rhoon, and Hendrik Vonkeman, Maassluis, Netherlands, assignors to Unilever N.V., Rotterdam, Netherlands
No Drawing. Continuation-in-part of application Ser. No. 700,030, Jan. 24, 1968, which is a continuation-in-part of application Ser. No. 453,483, May 5, 1965. This application Aug. 29, 1969, Ser. No. 854,250
Claims priority, application Great Britain, May 8, 1964, 19,237/64; July 15, 1964, 29,052/64
Int. Cl. C12d 1/02
U.S. Cl. 195—30       21 Claims

ABSTRACT OF THE DISCLOSURE

The specification discloses a process for preparing prostaglandins which comprises incubating, under aerobic conditions, a mixture comprising a prostaglandin-synthesizing enzyme system prepared from animal tissue, glutathione, and an all-cis polyunsaturated carboxylic acid of the formula $$CH_3(CH_2)_n(CH=CHCH_2)_p(CH_2)_qCOOH$$

wherein $n$ is a number from 0 to 5, $p$ is a number from 3 to 5, and $q$ is a number from 0 to 8, with the proviso that the sum of $n+3p+q$ is from 16 to 20 and that when $p$ is 3 then $n$ is a number from 3 to 5. The enzyme system is obtained from living animal organ cells, e.g., thymus, iris, genital glands and the like.

---

This invention relates to a process for the preparation of prostaglandins.

This application is a continuation-in-part of our U.S. application Ser. No. 700,030, filed Jan. 24, 1968, which in turn is a continuation-in-part of our U.S. application Ser. No. 453,483, filed May 5, 1965, both now abandoned.

In seminal fluid from man and several animals hydroxycarboxylic acids having pharmacodynamic effects, such as hypertensive or hypotensive activity, and smooth muscle-stimulating activity, have been established. The active principle—called prostaglandin—has proved to be present in a variety of accessory genital organs, especially in prostate glands (glandulae vesicalis and ampullae ductus), but also in other organs, such as thymus, iris and lungs. Vesicular glands of sheep have proved to be especially rich in prostaglandin, but also glands of other mammals appeared to contain appreciable amounts of prostaglandin.

The active principle, the prostaglandin, has been proved to contain a range of unsaturated non-aromatic hydroxycarboxylic acids, all related to the parental carboxylic acid, the 7-(2′octyl-cyclopentyl)heptanoic acid, known as prostanoic acid of the following Formula I:

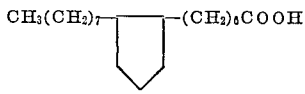

The following prostaglandins have been identified:
PGE$_1$(11α,15-dihydroxy-9-keto-prost-13-enoic acid)
PGE$_2$(11α,15 - dihydroxy-9-keto-prosta-5,13-dienoic acid) and
PGE$_3$(11α,15-dihydroxy-9-keto-prosta - 5,13,17 - trienoic acid)
which are believed to have the Formula II:

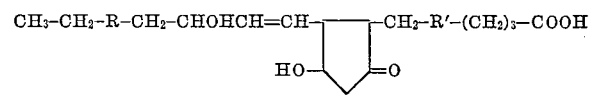

wherein R and R′ are respectively both —CH$_2$CH$_2$— in PGF$_{1a}$(9α,11α,15 - trihydroxy-prost-13-enoic acid) and both —CH=CH— in PGE$_3$.
PGF$_{1a}$(9α,11α,15-trihydroxy-prost-13-enoic acid) and PGF$_{2a}$(9α,11α,15-trihydroxy-prosta - 5,13 - dienoic acid) are believed to have the following Formula III in which R′ is respectively —CH$_2$CH$_2$— and —CH=CH—:

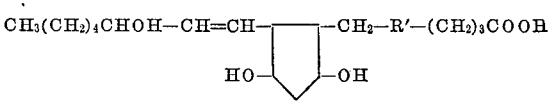

PGE$_1$, PGE$_2$, PGE$_3$ and PGF$_{1a}$ show a contracting action on smooth muscle and hypotensive activity, and PGE$_2$ is generally the most active of these compounds.

Prostaglandins have been isolated by extracting mammalian glandular tissue, in particular genital gland tissue, such as that of vesicular glands. It has been shown that the yield of prostaglandin from these sources can be slightly increased by the addition of small amounts of detergents or specific enzymes, especially those with esterase activity. The slightly increased yields are thought to be brought about by the disintegration of cell-membranes or by liberating prostaglandins which are available in a bound form in the tissue. However, this addition of detergents or specific enzymes, causing an improved yield of extraction, only represents an improvement in the recovery of the active principle present as such.

Prostaglandins now include both naturally occurring prostaglandins and other related derivatives of prostanoic acid and its homologues, which compounds may or may not have pharmacodynamic effects. Certain polyunsaturated carboxylic acids can be converted into prostaglandins by aerobic conversion with an enzyme system present in comminuted animal tissue material.

It has now been found that the preparation of prostaglandins from precursor acids by this enzyme system can be improved by incubating an all-cis-polyunsaturated carboxylic acid of the structure $$CH_3(CH_2)_n(CH=CH—CH_2)_p(CH_2)_qCOOH$$

wherein $n$, $p$ and $q$ represent numerals, $n$ is from 0 to 5, $p$ is from 3 to 5 and $q$ is from 0 to 8, with the provision that $n+3p+q$ is from 16 to 20, and when $p$ is 3, $n$ is from 3 to 5, under aerobic conditions with a prostaglandin synthesizing enzyme system prepared from animal tissue and adding a stimulating amount of glutathione to the incubation mixture.

Glutathione (gamma-L-glutamyl-L-cysteinyl glycine) is a tripeptide containing a —SH group, often denoted as GSH, and is easily oxidised to the disulphide GSSG. Glutathione is therefore sometimes referred to as reduced glutathione.

The stimulating effect has proved to be highly specific for glutathione; many other compounds which also contain a —SH group are almost inactive in this respect, e.g. crysteine, homocysteine, coenzyme A, thioglycollic acid and thiophenol.

It has been found that the conversion of a precursor acid into prostaglandin can be increased when a stimulating amount of glutathione is added to the incubation mixture. Thus, when per mole of precursor 0.1 to 50 moles, preferably 0.5 to 5 moles of glutathione are added, increased yields of prostaglandins can be obtained. It has been found that maximal yields of prostaglandins can be obtained where per mole of precursor from 2 to 3 moles of glutathione are made available to the enzyme. The effect of the glutathione addition is that the prostaglandin synthesising enzyme system available is enabled to convert more precursor acid into prostaglandin, and by this means higher yields of prostaglandin can be obtained.

It has also been discovered that the addition of glutathione to the reaction mixture suppresses the formation of prostaglandins of the F-series and favours the formation of prostaglandins of the E-series.

The effect of glutathione addition can particularly well be demonstrated using a particulated enzyme system and e.g. comminuted sheep vesicular glands. Here even the addition of 0.1 mole of glutathione per mole of precursor may bring about an increase in the amount of precursor converted. Preferably, however, from 0.5 to 5 moles are added.

The polyene acid precursors can be used as the free acids or in the form of derivatives which behave as the acid under the conditions of incubation, for instance their sodium and potassium salts.

The polyene acid precursor can be one in which $n$ is from 3 to 5, $p$ is from 3 to 5 and $q$ is from 0 to 8. Examples of such acids are:

all-cis-eicosa-9,12,15-trienoic acid
all-cis-eicosa-8,11,14-trienoic acid
all-cis-eicosa-7,10,13-trienoic acid The conversion of some of the tetraenoic acids containing 18 and 22 carbon atoms into prostaglandins has produced higher yields than could be obtained in the case of the corresponding trienoic acids.

Preferably the polyene acid used is one in which $n$ is 4, $p$ is from 3 to 5 and $q$ is from 0 to 7.

Acids of this class are the precursors of $PGE_1$ and $PGE_2$:

all-cis-eicosa-8,11,14-trienoic acid (bis-homo-gamma-linolenic acid) and
all-cis-eicosa-5,8,11,14-tetraenoic acid (arachidonic acid) resp.

The polyene acid can also be one in which $n$ is from 0 to 2, $p$ is from 4 to 5 and $q$ is from 0 to 8. Examples of acids belonging to this group are:

all-cis-eicosa-6,9,12,15,18-pentaenoic acid
all-ciseicosa-4,7,10,13,16-pentanenoic acid
all-cis-eicosa-5,8,11,14,17-pentaenoic acid The last-mentioned acid is the precursor acid of $PGE_3$ and belongs to an even more restricted group satisfying the general formula in which $n$ is 1, $p$ is from 4 to 5 and $q$ is from 0 to 7. When in the polyene acid $q$ is 2 or 5, substantially biologically active prostaglandins are generally obtained.

The invention thus comprises obtaining prostaglandins by incubation of the polyene acids with a prostaglandin synthesising enzyme system originating from living cells. Suitable cell material for the preparation of the prostaglandin synthesising enzyme system are such animal organs as genital glands, thymus, iris and lungs, intestines, pancrease, adrenals and brains. Animal organ tissue of ruminants, particularly of cattle and sheep, are preferred. Sheep vesicular gland is particularly preferred as a source of the desired enzyme system.

Homogenates or slices of these organs, especially of vesicular glands of sheep, and preparations from them, for example supernatant and other cell fractions, can be used under physiological or sub-physiological conditions. It is preferable to use homogenised animal tissue, or a supernatant fraction from centrifugation of a homogenised animal tissue. Separation by centrifugation of homogenised organs into supernatant and precipitate does not always give desirably active fractions, but it is a simple matter to test whether a particular preparation has sufficient of the necessary prostaglandin-synthesising enzyme system.

An important object of the present invention is the conversion of the fatty acids into prostaglandins by incubating these compounds with prostaglandin synthesising enzyme systems, e.g. homogenates or slices of the above-mentioned organs, such as genital organs of cattle, more particularly vesicular glands of sheep, under physiological or sub-physiological conditions permitting the uptake of oxygen and adding glutathione.

The conversion of the polyene acids by the prostaglandin synthesising enzyme system is preferably carried out after the addition of glutathione and a stimulating amount of antioxidant. Antioxidants which proved beneficial are propyl gallate, ascorbic acid and various hydroxybenzenes such as phenol (1-hydroxybenzene), hydroquinone (1.4-dihydroxybenzene) and 1,2,3-trihydroxybenzene. Preferably the concentration of antioxidant is from $5 \times 10^{-6}$ to $5 \times 10^{-3}$ molar, optimal yields being obtained from $1 \times 10^{-14}$ to $1 \times 10^{-3}$ molar.

Furthermore, the yield can be increased by the incorporation in the incubating mixture of sugars (e.g. glucose), amino acids, vitamins.

It has been found advantageous to carry out the incubation of the fatty acids or their derivatives at a temperature which is preferably between 10° and about 60° C. and especially from 30° to 40° C. and a buffered solution having a pH of from 4 to 10, preferably from 7 to 9.

As according to the invention the prostaglandin synthesising enzyme system may be contained in e.g. comminuted organ and in supernatant, the enzymatic activity calculated per weight unit of the source of enzyme material varies widely. Consequently, highly varying weight ratios of polyene acid to source of enzyme system can be used. In case comminuted sheep vesicular glands are used the weight ratio of polyene acid to fresh organ preferably ranges from 1:500 to 1:1500.

In case particulated enzyme fractions are used which contain the enzyme system in more concentrated form, the weight ratio of polyene acid to the weight of protein in the fraction may be in the range of 1:2 to 1:30.

Generally the precursor material, the enzyme preparation and the glutathione are allowed to react under aerobic conditions for periods varying between several minutes and several hours, and preferably for a period of from 5 to 180 minutes, especially 10 to 30 minutes. The presence of oxygen is necessary and it is beneficial to aerate the reaction mixture during the conversion.

In the conversion of larger amounts of substrates it is desirable to determine the optimum amount of precursor substrate and glutathione in 2.5 molar quantity are added ration thereof. For this purpose various concentrations of substrate and gultathione in 2.5 molar quantity are added to give small amounts of enzyme preparation, and samples are taken at different times. It is preferable to use the whole homogenised organs although active fractions can be obtained by e.g. differential centrifugation. Thus a particulated enzyme fraction can be provided by conventional centrifugation of homogenised animal tissue and subsequent ultracentrifugation of the supernatant. The pellet of solid material obtained by ultracentrifugation is an enzyme preparation which is preferably used in the process according to the invention. From the data obtained concerning the conversion yield the optimum reaction conditions can be determined. In these experiments known properties (such as the determination of the ultraviolet absorption spectrum at 278 or 280 nanometers before and after the addition of sodium hydroxide) can be used for the determination of the amounts of prostaglandins formed. These data are then used in the preparations on a larger scale.

The process according to the invention is an improved biosynthetic process of manufacturing prostaglandins. The improved process involving the addition of a small amount of glutathione and preferably of an antioxidant which may result in conversion degrees of the precursor into prostaglandins which are up to 5 times higher than those obtained in the absence of antioxidant and without adding glutathione.

EXAMPLE I

Sheep vesicular glands (250 g.) were homogenised with 600 ml. 0.1 M tripotassium phosphate, pH=7.1, in a high-speed cooled homogeniser for 30 sec. at 0° C. The homogenate was then centrifuged for 10 minutes at 4,000g and the supernatant again subjected to centrifugation under the same conditions. The turbid solution obtained was now centrifuged in an ultra-centrifuge for 60 minutes at about 100,000g.

The precipitation was stirred with 200 ml. buffer, pH=8.0, containing 0.01 M tripotassium phosphate, 0.001 M disodium dihydrogen ethylenediamine tetra-acetate, and 0.001 M cysteine, and again precipitated for 60 minutes at 100,000g. The washed particulate fraction was found to contain about 1.9 g. protein (biuret reaction) and only 1.6 mg. PGE. It was suspended in 100 ml. 0.1 M tripotassium phosphate, pH=8.0, and then incubated for 5 minutes at 30° C. with a 0.2 M tris(hydroxymethyl)-aminomethane hydrochloride buffer (pH=8.0) solution containing 200 mg. (0.70 millimole) bis homo-gamma-linolenic acid, 500 g. (1.6 millimole) glutathione (the reduced form) and 75 mg. (0.35 millimole) propyl gallate. At the pH of the buffer solution the fatty acid was partially present in the form of sodium and potassium salts. The incubation was terminated by the addition of 0.2 M aqueous citric acid solution until a pH of 3.5 was reached (about 150 ml). The acidified mixture was extracted twice with an equal volume of ether. In the ethereal extract 158 mg. (67%) $PGE_1$ were found to be present.

In similar processes without adding propyl gallate to the incubation mixture 54 mg. (23%) $PGE_1$ were obtained; the omission of glutathione resulted in a yield of only 19 mg. (8%), whereas in the absence of either glutathione or propyl gallate 16 mg. (7%) yield was obtained.

EXAMPLE II

A piece of duodenum (65 g. wet weight) of a male sheep was cut into pieces and homogenised in a high speed homogeniser with 200 ml., 0.01 M phosphate buffer, pH=8.0. The homogenate was centrifuged for 10 minutes under 4,000g. The turbid supernatant was separated and centrifuged for 60 minutes under 100,000g. The pellet of solid material obtained from the second centrifugation was suspended in 12 ml., 0.1 M phosphate, pH=8.0. This enzyme preparation, which contained 30 mg. protein per ml., was used for the following incubations.

In incubation (a) part of the enzyme preparation (1.5 ml.) was incubated with 95 micrograms (0.33 micromole) of 1-$^{14}$C) bis-homo-gamma-linolenic acid (95,000 c.p.m.) in 1 ml. 0.2 M tris-(hydroxymethyl) aminomethane hydrochloride (pH 8.0) for 10 minutes at 30° C.

A second incubation (b) was carried out with 0.3 mg. (1 micromole) glutathione.

A third incubation (c) was carried out with 1 micromole glutathione and 0.01 mg. (0.05 micromole) propyl gallate.

After the incubation each mixture was acidified and extracted with ether. After the addition of 182 micrograms $PGE_1$ and 100 micrograms $PGF_{1\alpha}$ the ethereal extracts were evaporated to dryness. The resulting material was chromatographed on a thin layer of silica gel G (ex Merck, which is a silica gel containing 13% of gypsum made by the method of Stahl) with the solvent system chloroform-methanol-acetic acid-water in proportions 90:6:1:1 by volume) as eluent. The location of the prostaglandins on the chromotogram was determined by exposure to iodine vapour after which iodine was allowed to escape and the zones containing prostaglandins E and F respectively were scraped off. The $PGE_1$ was eluted from the silica gel with methanol and treated with 0.5 M methanolic potassium hydroxide for 10 minutes at 20° C. The dehydration product so formed was isolated by TLC on silica gel G (ex Merck) with the ether containing 2% by weight of acetic acid. Part of it was tested for radioactivity; with another part the absorption extinction at 280 nanometers was determined. It was calculated that $PGE_1$ formed in the biosynthesis had the following radioactivity:

| Incubation | C.p.m. | Yield of $PGE_1$, percent |
|---|---|---|
| (a) Without glutathione addition | 167 | 0.17 |
| (b) With glutathione addition | 2,620 | 2.8 |
| (c) With glutathione and propyl gallate addition | 2,975 | 3.1 |

TLC on silica gel G (ex Merck) impregnated with silver nitrate caused no further decrease in specific radioactivity of the dehydrated $PGE_1$. Thus in the incubation in the presence of glutathione only 2.8% of the bis-homo-gamma-linolenic acid had been converted to prostaglandin $PGE_1$; the addition of a small amount of propyl gallate improved the conversion to 3.1% of the carboxylic acid.

EXAMPLE III

This example shows the effect of varying the amount of glutathione. Mixtures were prepared containing 100 micrograms (0.3 micromole) of bis-homo-gamma-linolenic acid in 0.5 ml., 0.2 molar tris(hydroxyethyl) ainomethane hydrochloride, pH 8.0, 100 microgram (0.9 micromole) of hydroquinone in 0.5 ml., 0.1 molar phosphate buffer, pH 7.6, and 6 mg. of particulate enzyme fraction from sheep vesicular gland which contained 2 mg. protein (biuret reaction) in 0.5 ml., 0.1 molar phosphate buffer. To these mixtures 0.5 ml. of a glutathione solution in phosphate buffer, pH 7.6, 0.1 molar was added so as to obtain a final concentration in the incubation mixture as indicated in the table hereafter.

The incubation was then carried out aerobically with stirring for 15 minutes at 37° C. The reaction was stopped by the addition of 2 M aqueous citric acid until the pH was below 3. The lipid material was then extracted with ether. The combined ethereal extracts were washed with water until the pH of the wash water was about 7. The ether was evaporated and the residue taken up in 1 ml. methanol. An aliquot was diluted in a quartz cuvette with methanol to 2.5 ml.; 0.5 ml., 3 N potassium hydroxide in aqueous methanol was added and the $PGE_1$ content was determined by measuring the absorption at 278 nanometer in a spectrophotometer. From these results the amounts of prostaglandin in micromoles formed per mg. protein were calculated.

Effect of varying glutathione concentration on conversion into prostaglandin concentration of precursor constant $0.16 \times 10^{-3}$ M:

| | Moles of glutathione per mole precursor | Yield (millimicromole/ mg. protein) |
|---|---|---|
| Glutathione concentration, molar: | | |
| 0 | 0 | 30 |
| $1 \times 10^{-5}$ | 0.006 | 33 |
| $1 \times 10^{-4}$ | 0.06 | 30 |
| $1 \times 10^{-3}$ | 0.6 | 67 |
| $5 \times 10^{-3}$ | 3 | 88 |
| $1 \times 10^{-2}$ | 6 | 82 |
| $5 \times 10^{-2}$ | 30 | 56 |
| $1 \times 10^{-1}$ | 60 | 35 |

EXAMPLE IV

This example shows the effect of varying the amount of antioxidant. Experiments were carried out in which the concentration of hydroquinone was varied in which the amounts of bis-homo-gamma-linolenic acid and enzyme preparation were kept constant. Conditions were similar to those of the preceding example. One series was run in the absence of glutathione; another series with glutathione ($1.10^{-3}$ M):

| Hydroquinone concentration, molar: | PGE₁ formed in millimicromoles/mg. protein | |
|---|---|---|
| | Without glutathione | With glutathione |
| 0 | 8 | 32 |
| $1.10^{-6}$ | | 27 |
| $1.10^{-5}$ | | |
| $1.10^{-4}$ | 33 | 89 |
| $5.10^{-4}$ | 34 | 105 |
| $1.10^{-3}$ | 31 | 69 |
| $5.10^{-3}$ | 7 | |
| $1.10^{-2}$ | 0 | 4.5 |

EXAMPLE V

This example shows the effect of various antioxidants. 150 micrograms (0.5 micromole) bis-homo-gamma-linolenic acid was incubated with 2 mg. protein obtained from 0.2 g. sheep vesicular glands in 2 ml. tris buffer solution, pH 8.0, for 2 minutes at 30° C. after adding 615 micrograms (2 micromoles) glutathione and—with the exception of the first two experiments reported below—1 micromole of antioxidant. The reaction was stopped by the addition of citric-acid extraction with ether and determination of increase in absorbance at 278 nanometers after the addition of potassium hydroxide. The yield of PGE₁ in percentage calculated on the starting material was determined by determination of the ultraviolet absorption maxima at 278 nanometers after the addition of sodium hydroxide, and correction was made for the prostaglandins already present, which amount was determined by a blank experiment.

| Addition: | PGE₁ (percent) |
|---|---|
| No glutathione, no antioxidant | 5 |
| Glutathione but no antioxidant | 20 |
| Glutathione and— | |
| 1 - hydroxybenzene | 68 |
| 1,2 - dihydroxybenzene | 29 |
| 1-3-dihydroxybenzene | 23 |
| 1,4 - dihydroxybenzene | 58 |
| 1,2,3, - trihydroxybenzene | 62 |
| 1,3,5 - trihydroxybenzene | 32 |
| Propyl gallate | 50 |
| Ascorbic acid | 40 |

EXAMPLE VI

The general procedure described in Example III was repeated, using, however, the fourfold quantity of protein material from sheep vesicular glands, and the same amounts of glutathione and antioxidant, which was 1,4-dihydroxybenzene(hydroquinone); the acid used was ($1-{}^{14}$C) bis-homo-gamma-linolenic acid.

The following results were obtained:

| Addition | PGE₁ radioactivity (Percent) | PGF₁ₐ radioacivity (Percent) |
|---|---|---|
| No glutathione, no hydroquinone | 32 | 10 |
| No glutathione, 1 micromole hydroquinone | 26 | 12 |
| 2 micromoles glutathione, no hydroquinone | 77 | 1-2 |
| 2 micromoles glutathione plus 1 micromole hydroquinone | 88 | 1-2 |

EXAMPLE VII

Particulate fractions of various organs were prepared by homogenising in a 0.05 M potassium phosphate buffer, pH 8, at 0–5° C. The homogenate was centrifuged twice at $4,000 \times g$ and the supernatant for 1 hour at $100,000 \times g$. The sediment was used for the incubations which were carried out at 30° C. for 15 minutes. In these experiments 1-2.5 microgram ($1-{}^{14}$C) bis-homo-gamma-linolenic acid and 15 micrograms glutathione per mg. protein (biuret reaction) were added. After the reaction the incubation mixture was acidified with 0.2 M citric acid, and 500 micrograms PGE₁ was added as a carrier. The PGE₁ was extracted with ether and purified by TLC, and the radioactivity was determined.

The following results were obtained:

| Organ (sheep) | Protein (mg.) | Acid (microgram) | Radioactivity (PGE₁ (percent)) |
|---|---|---|---|
| Intestines | 40 | 100 | 2.60 |
| Lung | 35 | 50 | 1.85 |
| Uterus | 36 | 50 | 0.79 |
| Thymus | 39 | 50 | 0.55 |
| Heart | 36 | 50 | 0.14 |
| Liver | 50 | 50 | 0.23 |
| Kidney | 40 | 50 | 0.14 |
| Pancreas | 60 | 100 | 0.06 |

Similar results were obtained by using organs of guinea pig and rat.

EXAMPLE VIII

This example refers to the conversion of a variety of carboxylic acids into prostaglandins.

Sheep vesicular glands (350 g.) were disintegrated in a 0.1 molar phosphate buffer of pH 8. The mixture was centrifuged ($4,000 \times g$), filtered and centrifuged again ($55,000 \times g$). The precipitate was lyophilised after washing and dried; yield 7 g. The particulate enzyme fraction thus obtained was used in the various tests as shown below:

100 micrograms of fatty acid, 0.65 micromole of glutathione and 0.55 micromole hydroquinone were dissolved in a test tube containing 1 ml. 0.2 molar tris-HCl buffer, pH 8. The tube was placed in a water bath at 37° C. and 6 mg. of the particulate enzyme fraction (2 mg. protein suspended in 1 ml. 0.2 M tris-HCl buffer) added. The reaction mixture was acidified after an incubation time of 30 minutes, extracted with ether and evaporated to dryness. The residue was dissolved in methanol (1 ml.) and in 0.2 ml. of the solution the prostaglandin content was determined from the increase in absorbance at 278 nanometers after the addition of alkali. Under the conditions described all reactions had obtained optimal conversion after an incubation for 30 minutes.

The results obtained are tabulated below:

| Fatty acid (all-cis isomer): | Prostaglandin formed (E-type), percent |
|---|---|
| Octadeca-6,9,12-trienic acid | 3–5 |
| Octadeca-3,6,9,12-tetraenoic acid | 11 |
| Nonadeca-7,10,13-trienonic acid | 60 |
| Nonadeca-4,7,10,13-tetraenoic acid | 41 |
| Eicosa-8,11,14-trienoic acid | 68 |
| Eicosa-5,8,11,14-tetraenoic acid | 71 |
| Heneicosa-9,12,15-trienoic acid | 36 |
| Heneicosa-6,9,12,15-tetraenoic acid | 25 |
| Docosa-10,13,16-trienoic acid | 3–5 |
| Docosa-7,10,13,16-tetraenoic acid | 24 |
| Eicosa-5,8,11,14,17-pentaenoic acid | 5 |
| Eicosa-9,12,15-trienoic acid | 1–2 |
| Eicosa-7,10,13-trienoic acid | 18 |

In a similar way all-cis-nonadeca-4,7,10,13,16-pentaenoic acid and all-cis heneicosa-6,9,12,15,18-pentaenoic acid are also converted into prostaglandins in small yields.

What is claimed is:

1. A process for the preparation of prostaglandins, in which an all-cis polyene carboxylic acid of the structure $CH_3(CH_2)_n(CH=CHCH_2)_p(CH_2)_qCOOH$ where $n$, $p$ and $q$ represent numerals, $n$ is from 0 to 5, $p$ is from 3 to 5 and $q$ is from 0 to 8, with the provision that $n+3p+q$ is from 16 to 20 and when $p$ is 3, $n$ is from 3 to 5, is incubated under aerobic conditions with a prostaglandin synthesising enzyme system prepared from animal tissue and a stimulating amount of added glutathione.

2. A process according to claim 1, where the amount of added glutathione is within the range from 0.1 to 50 moles per mole of the polyene carboxylic acid.

3. A process according to claim 1, where in the polyene acid $n$ is from 3 to 5, $p$ is from 3 to 5 and $q$ is from 0 to 8.

4. A process according to claim 3, where in the polyene acid $n$ is 4, $p$ is from 3 to 5 and $q$ is from 0 to 7.

5. A process according to claim 4, where the polyene acid is all-cis-eicosa-8,11,14-trienoic acid.

6. A process according to claim 4, where the polyene acid is all-cis-eicosa-5,8,11,14-tetraenoic acid.

7. A process according to claim 1, wherein the polyene acid $n$ is from 0 to 2, $p$ is from 4 to 5 and $q$ is from 0 to 8.

8. A process according to claim 7, where the polyene acid is all-cis-eicosa-5,8,11,14,17-pentaenoic acid.

9. A process according to claim 1, where in the polyene acid $q$ is 2.

10. A process according to claim 1, wherein the polyene acid $q$ is 5.

11. A process according to claim 1, where the incubation is carried out in the presence of a stimulating amount of added antioxidant.

12. A process according to claim 11, where the antioxidant is selected from a group consisting of ascorbic acid, hydroxybenzenes and propyl gallate.

13. A process according to claim 11, where the incubation mixture contains an amount of the added antioxidant within the range from $5 \times 10^{-6}$ to $5 \times 10^{-3}$ mole per litre.

14. A process according to claim 1, where the prostaglandin synthesising enzyme prepared from animal tissue is comminuted animal organ tissue.

15. A process according to claim 14, where the prostaglandin synthesising enzyme system is a particulated fraction provided by conventional centrifugation of homogenised animal tissue and subsequent ultracentrifugation of the supernatant.

16. A process according to claim 1, where the prostaglandin synthesising enzyme system is one prepared from animal organ tissue selected from the group consisting of genital gland, thymus, iris, lung, heart, liver, intestinal, pancreatic, adrenal and brain tissue.

17. A process according to claim 1, where the prostaglandin synthesising enzyme system is one prepared by centrifugation of a homogenised animal tissue.

18. A process according to claim 1, where the prostaglandin synthesising enzyme system is prepared from sheep vesicular gland.

19. A process according to claim 1, where the prostaglandin synthesising enzyme system is prepared from sheep intestine.

20. A process according to claim 1, in which the incubation mixture comprises all-cis-eicosa-8,11,14-trienoic acid, comminuted sheep vesicular gland, from 1.5 to 3 moles of glutathione per mole of the polyene acid and from 0.1 to 1 millimole of dihydroxybenzene per litre of incubation mixture and the mixture is aerated during incubation.

21. A process according to claim 1, in which the incubation mixture comprises all-cis-eicosa-5,8,11,14-tetraenoic acid, comminuted sheep vesicular gland, from 1.5 to 3 moles of glutathione per mole of the polyene acid, and from 0.1 to 1 millimole of dihydroxybenzene per litre of incubation mixture is added and the mixture is aerated during incubation.

References Cited

UNITED STATES PATENTS 3,296,091   1/1967   Beal et al. _____ 195—30

OTHER REFERENCES

Dixon et al., Enzymes, second edition, 1964, pp. 372–375.

LIONEL M. SHAPIRO, Primary Examiner

PO-1050
(5/69)

UNITED STATES PATENT OFFICE
CERTIFICATE OF CORRECTION

Patent No. 3,579,425      Dated May 18, 1971

Inventor(s) David Adriaan van Dorp et al

It is certified that error appears in the above-identified patent and that said Letters Patent are hereby corrected as shown below:

Column 1, lines 5 and 6, delete "assignors to Unilever N.V., Rotterdam, Netherlands" and insert -- assignors by mesne assignment to Lever Brothers Company, a corporation of the State of Maine --. Column 2, lines 2 and 3, delete "$PGF_1\alpha(9\alpha, 11\alpha, 15$-trihydroxy-prost-13-enoic acid)" and insert -- $PGE_1$; $-CH_2CH_2-$ and $-CH=CH-$ in $PGE_2$; --; line 58, "crysteine" should be -- cysteine --. Column 3, line 55, "pancrease" should be -- pancreas --. Column 4, lines 43 and 44, delete "and glutathione in 2.5 molar quantity are added ration" and insert -- to be added per unit of mass of organ or preparation --; line 45, "gultathione" should be -- glutathione --. Column 6, line 26, "ainomethane" should be -- aminomethane --. Column 8, line 46, "trienic" should be -- trienoic --; line 48, "trienonic" should be -- trienoic --.

Signed and sealed this 9th day of November 1971.

(SEAL)
Attest:

EDWARD M. FLETCHER, JR.          ROBERT GOTTSCHALK
Attesting Officer                Acting Commissioner of Patents